US006118643A

United States Patent [19]

Dyer et al.

[11] Patent Number: 6,118,643

[45] Date of Patent: Sep. 12, 2000

[54] MODULAR SURGE SUPPRESSION SYSTEM AND METHOD

[75] Inventors: Thomas J. Dyer, Windermere; William B. Hawkins, II, Winter Springs; John N. Park, Heathrow, all of Fla.

[73] Assignee: Kui Hwan Shin, Rep. of Korea

[21] Appl. No.: 09/261,386

[22] Filed: Mar. 3, 1999

Related U.S. Application Data

[60] Provisional application No. 60/099,593, Sep. 9, 1998.

[51] Int. Cl.[7] .................... H02H 3/22

[52] U.S. Cl. .................... 361/111; 361/118; 361/119; 439/13; 439/31

[58] Field of Search .................... 361/111, 91.1, 361/117–119; 439/11, 13, 31, 32

[56] References Cited

U.S. PATENT DOCUMENTS

| | | | |
|---|---|---|---|
| 4,639,841 | 1/1987 | Salestrom et al. . | |
| 4,743,999 | 5/1988 | Hames | 361/56 |
| 4,875,871 | 10/1989 | Booty, Sr. et al. . | |
| 5,249,970 | 10/1993 | Jennings | 439/31 |
| 5,274,527 | 12/1993 | Retzlaff | 361/118 |
| 5,582,522 | 12/1996 | Johnson . | |
| 5,595,503 | 1/1997 | Pittman et al. | 439/446 |
| 5,658,152 | 8/1997 | Selker | 439/31 |
| 5,957,701 | 9/1999 | McMillin | 439/13 |

OTHER PUBLICATIONS

Leviton product brochure: "What's In a Name!" 1997. (No Month).

*Primary Examiner*—Michael J. Sherry

*Attorney, Agent, or Firm*—Allen, Dyer, Doppelt, Milbrath & Gilchrist, P.A.

[57] ABSTRACT

A surge suppression module is provided for connection to a wall receptacle and interconnection with other modules. Each module includes a top portion rotatably connected to a bottom portion. A male electrical plug extends from a top surface, and a female plug from a bottom surface. The top and bottom surfaces of the top and bottom portions, respectively, form opposing top and bottom surfaces of the module when the module is in an in-line orientation with an in-line axis through the module passing through the female and male plugs. The top and bottom portions are rotatable about an axis of rotation angled at 45° to the in-line axis, and rotate from the in-line orientation to a wall mounting orientation, wherein the male plug extends from a side of the module and is perpendicular to in-line axis. Surge suppression and filtering circuitry is carried within the bottom portion along with connectors for connection of electrical equipment used with the surge suppression module. An interlocking connector for interlocking one module to another includes a tab extending from the top surface and a cam carried within the bottom portion for engaging a notch within the tab and interlocking and number of adjoining modules together in an in-line styled arrangement. A foot is rotatably carried by the housing and is rotatable from a stored position to an extended position extending outward from the module for contacting a wall and aligning the module generally parallel to the wall.

43 Claims, 10 Drawing Sheets

MODULAR SURGE SUPPRESSION SYSTEM AND METHOD

RELAYED APPLICATIONS

This application claims priority to related Provisional Patent Application Ser. No. 60/099,593 having filing date Sep. 9, 1998, commonly owned with the instant application.

FIELD OF THE INVENTION

The present invention relates to electrical surge suppression and power line filtering systems and more particularly to a system of interconnecting electrical surge suppression and power line filtering modules.

BACKGROUND OF THE INVENTION

Modular electrical systems using a plurality of discrete components adapted for selective connection are generally known for power circuitry. Typically the modular electrical conductor system permits interconnection of pre-wired components for distribution of power to preselected locations desired by the user. Also know is surge suppression modules designed for in-line connection with each other and to a primary module that includes an electrical cord connection to a wall outlet, or a surge suppressor that is permanently configured for connection to a wall receptacle. With a wire connection from the surge suppressor, the connected modules are typically hidden from view and under a table or desk to hopefully avoid interfering with personnel and furniture movement. Further known is surge suppression equipment that is permanently wired into the electrical system of a building, typically a commercial use building, at a large expense.

There is a need for surge suppression equipment that can be easily installed by a user, optionally include various connections for related electrical equipment, and can be conveniently located for use with personnel computers, stereo systems and the like without concern for an its awkward and unsightly display.

SUMMARY OF THE INVENTION

In view of the foregoing background, it is therefore an object of the present invention to provide a family of surge suppression and filtering modules, each of which can be plugged into a wall receptacle for protection of electrical equipment. It is further an object of the invention to provide interchangeable modules that can be connected to each other for allowing the user to create a customized surge suppression and filtering power strip.

These and other objects, advantages and features of the present invention are provided by a surge suppression module comprising a housing having a first body portion rotatably connected to a second body portion. The first body portion includes a first surface of the housing parallel to a second surface of the housing carried by the second body portion. The first and second surfaces form opposing side surfaces of the housing when the first and second body portion are in an inline orientation. The first and second body portions are rotatable from the in-line orientation to a wall mounting orientation, wherein the first surface on the first body portion is perpendicular to the second surface on the second body portion. Further, a male plug is carried by one of the first and second surfaces and a female plug is carried by the other of the first and second surfaces. A surge suppression and filtering circuit is carried by the housing and is operable with the male and female plugs for protection of electronic equipment operable with the surge suppression module.

A method aspect of the present invention includes providing a module including a first body portion having a male plug, a second body portion having a female plug operable with the male plug, the first and second body portions rotatably connected for rotation from an in-line orientation wherein the male and female plugs are aligned within an axis through the first and second body portions, to a wall mounting orientation wherein the male and female plugs are orientated perpendicular to each other, and an electrical circuit carried within at least one of the first and second body portions and operable with the male and female plugs, placing the module in the wall mounting orientation, plugging the male plug into a wall receptacle, and connecting electronic equipment to the electrical circuit. Method steps further include placing a second module in the in-line orientation, and plugging the male plug of the second module into the female plug of the first module.

BRIEF DESCRIPTION OF THE DRAWINGS

A preferred embodiment of the invention, as well as alternate embodiments are described by way of example with reference to the accompanying drawings in which.

DETAILED DESCRIPTION OF PREFERRED EMBODIMENTS

Figure 1:
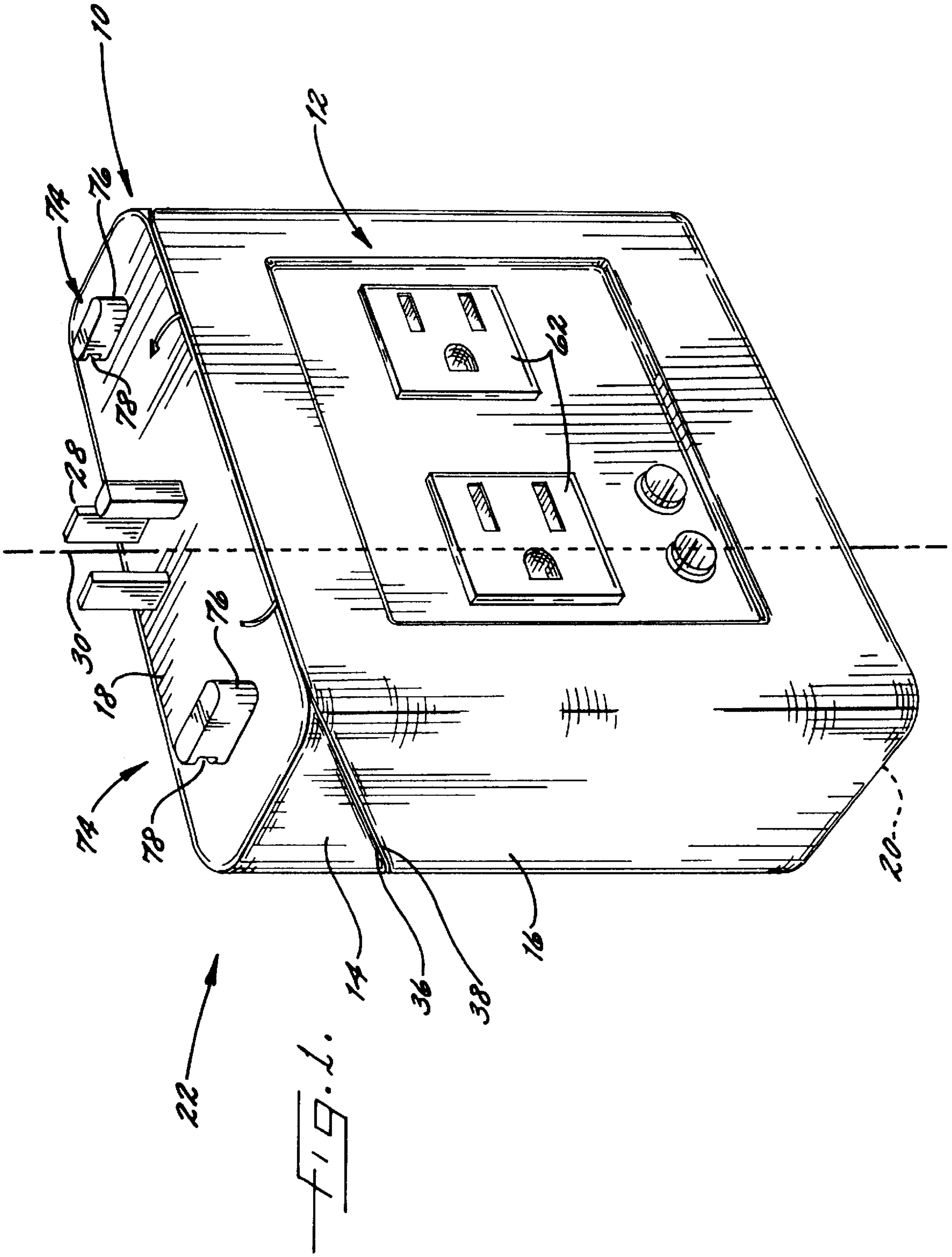
FIG. 1 is a perspective view of one preferred embodiment of a surge suppression module of the present invention illustrated in an in-line orientation.
Figure 2:
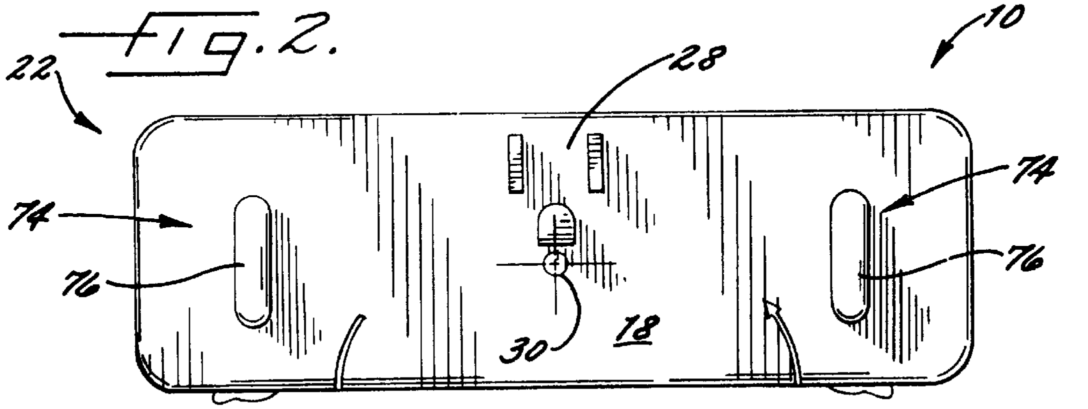
FIG. 2 is a top plan view of the embodiment of FIG. 1.
Figure 3:
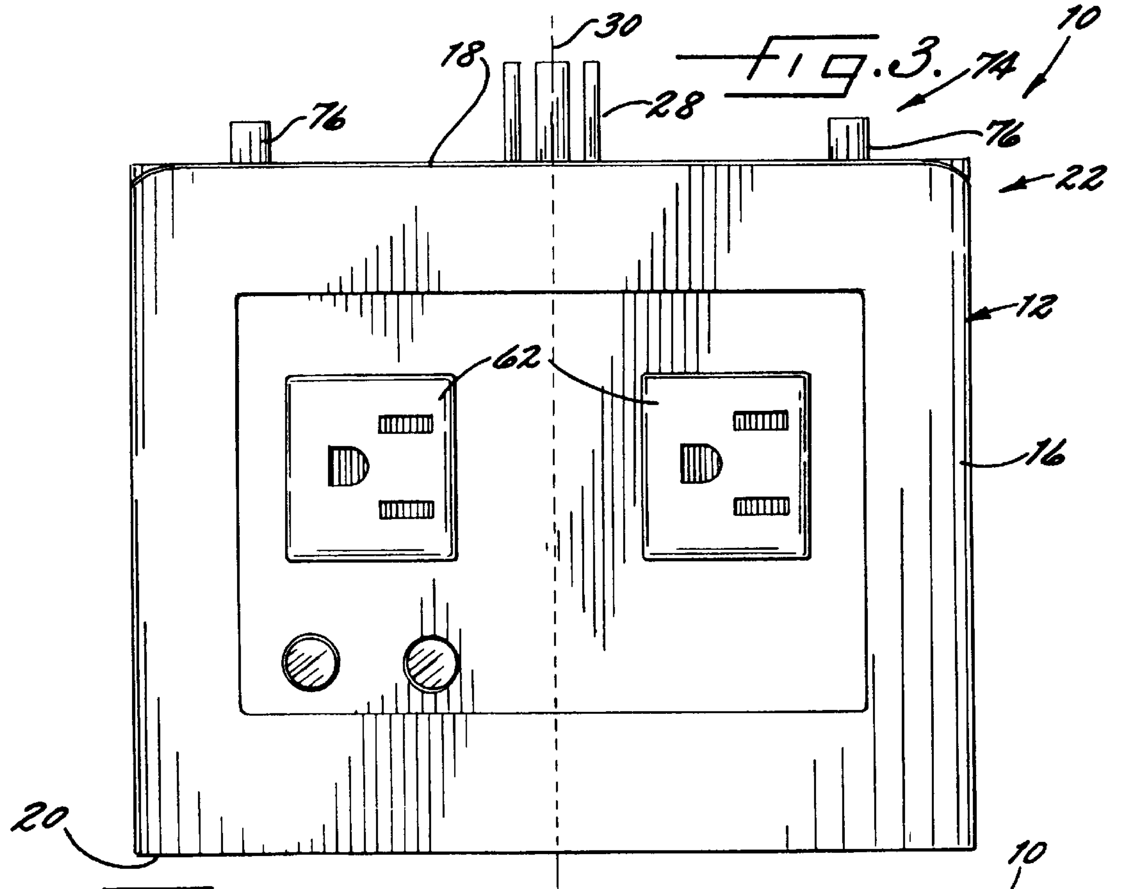
FIG. 3 is a front elevation view of the embodiment of FIG. 1.
Figure 4:
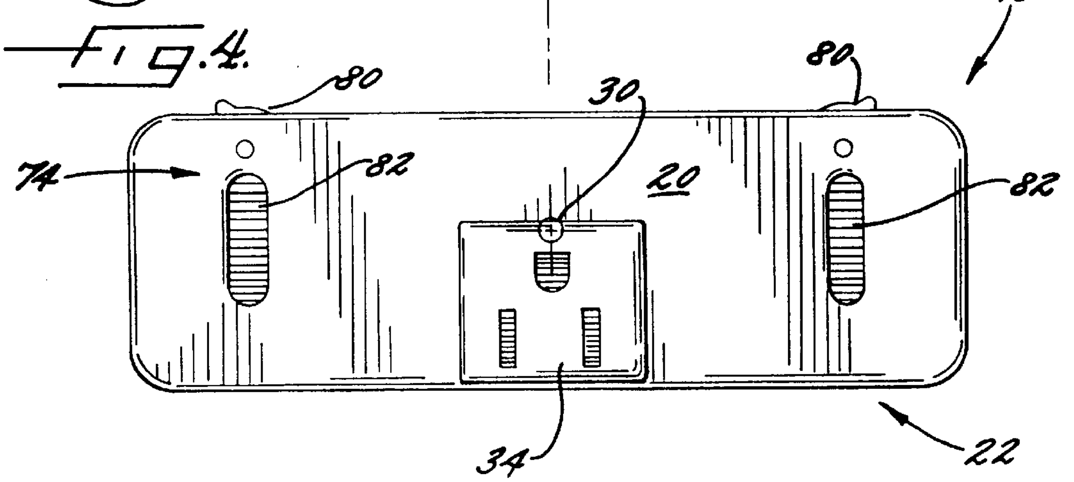
FIG. 4 is a bottom plan view of the embodiment of FIG. 1.
Figures 5, 6, 7:
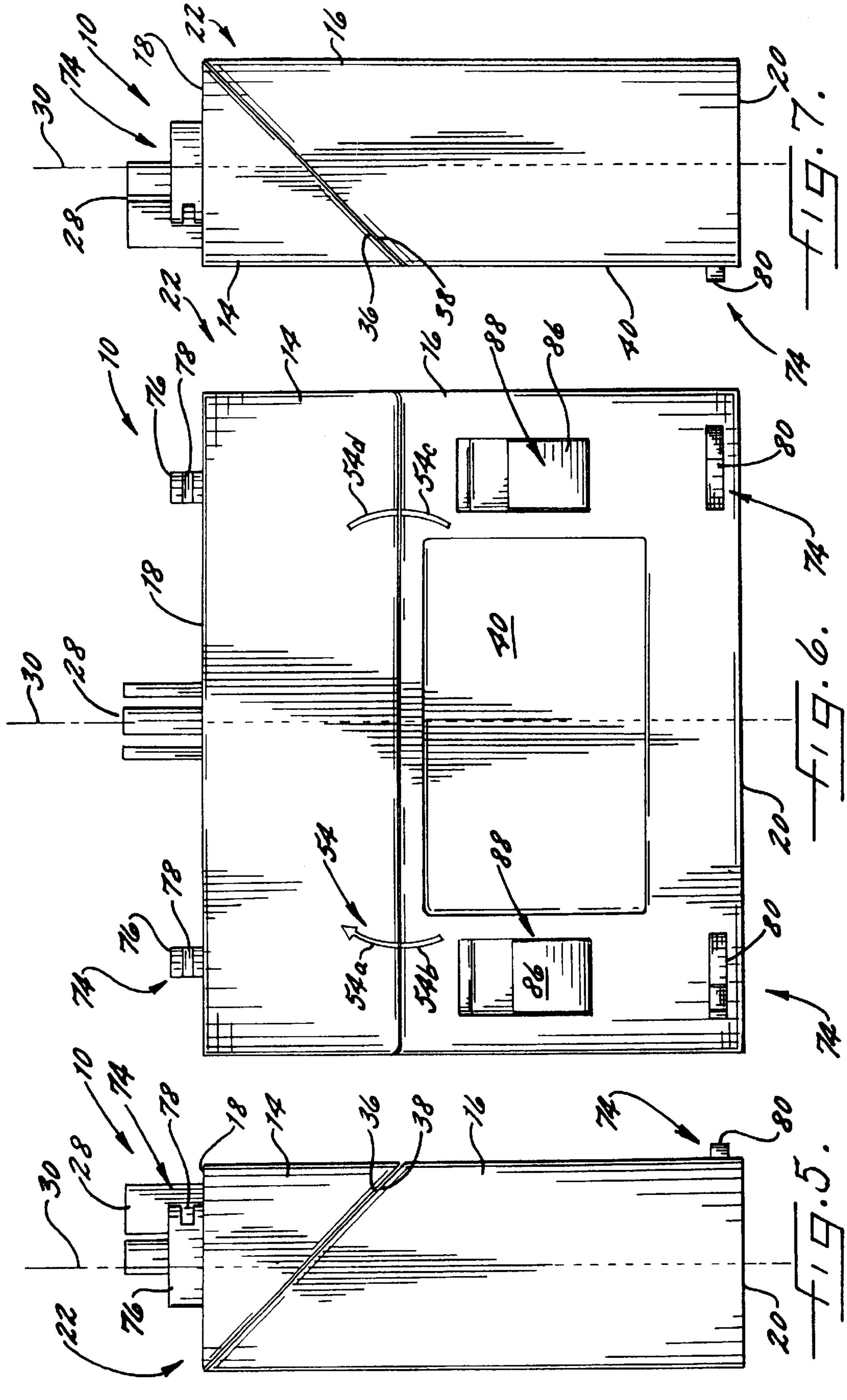
FIG. 5 is a right side view of the embodiment of FIG. 1.
FIG. 6 is a rear elevation view of the embodiment of FIG. 1.
FIG. 7 is a left side view of the embodiment of FIG. 1.

The present invention will now be described more fully hereinafter with reference to the accompanying drawings, in which preferred embodiments of the invention are shown. This invention may, however, be embodied ion many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

With reference initially to FIGS. 1–7, a surge suppression module 10 of the present invention includes a housing 12 having a top body portion 14 rotatably connected to a bottom body portion 16. The top body portion 14 includes a top surface 18 of the housing 12 that is parallel to a bottom surface 20 of the housing 12 which is the bottom surface 20 of the bottom body portion 16. As illustrated with reference again to FIGS. 1–7, the top surface 18 and the bottom surface 20 form opposing top and bottom surfaces of the housing 12 when the top and bottom body portions 14, 16 are in an in-line orientation 22.

Figure 8:
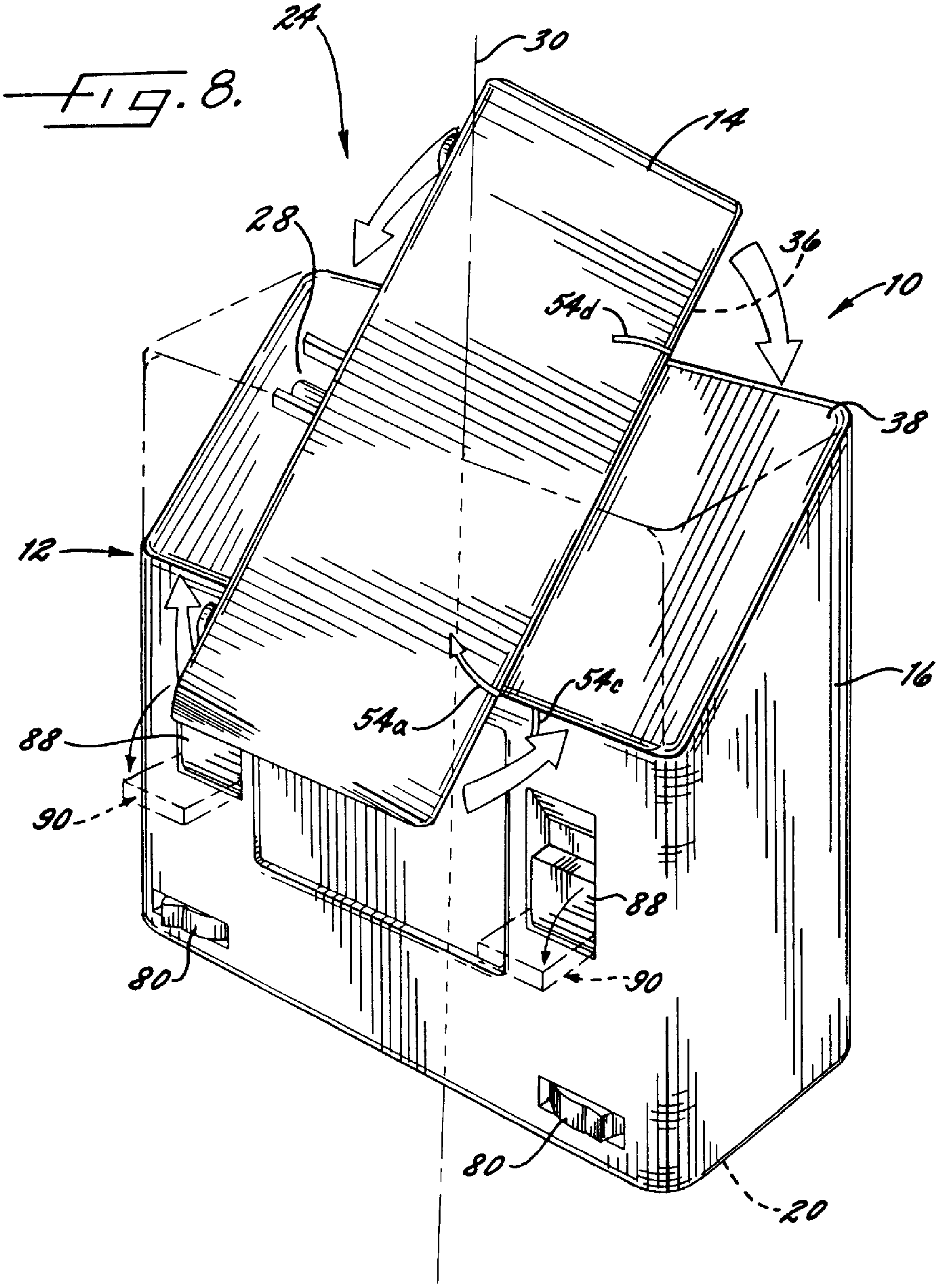
FIG. 8 is a rear perspective view of the embodiment of FIG. 1, illustrating a rotation of a first body portion about a second body portion.
Figure 9:
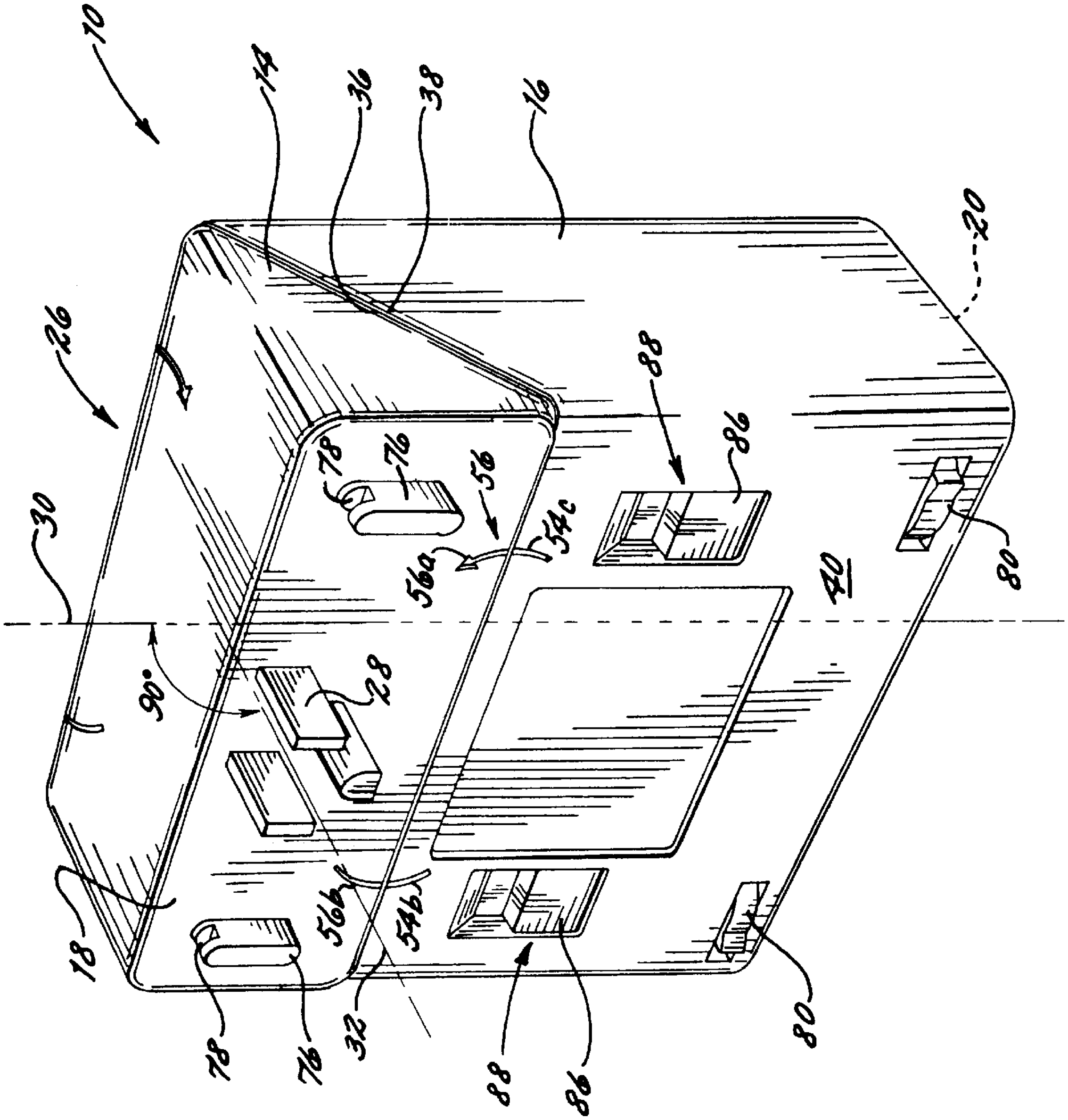
FIG. 9 is a rear perspective view of the embodiment of FIG. 1 illustrated in a wall mounting orientation.

As illustrated with reference again to FIG. 1, and to FIGS. 8 and 9, the top and bottom body portions 14, 16 are rotatable from the in-line orientation 22, as illustrated with reference to FIG. 1, through an intermediate rotation 24, illustrated with reference to FIG. 8, to a wall mounting orientation 26, wherein the top surface 18 of the top body portion 14 is perpendicular to the bottom surface 20, as illustrated with reference to FIG. 9. As illustrated, a male plug 28 carried on the top surface 18 is moved from an in-line axis 30 through the housing 12 when the housing is in the in-line orientation 22, to a direction 32 perpendicular to the in-line axis. The male plug 28 and a female plug 34 are aligned within the in-line axis 30 for the in-line orientation 22, as illustrated with reference again to FIGS. 1–7.

By way of example, rotation of the top body portion 14 relative to the bottom portion 16 may be accomplished through a rotation about an axis parallel to the top surface 18. However, as illustrated further with reference again to FIGS. 1, 8 and 9, a preferred embodiment includes the top body portion 14 having a surface 36 angled at 45° and opposing the top surface 18. In a cooperating fashion, the bottom body portion 16 includes a surface 38 opposing the bottom surface 20 and angled at 45° thereto. The angled surfaces 36, 38 and slidably rotate on each other, as illustrated with reference again to FIG. 8, to maintain a generally rectangular box shaped housing 12 when in either the in-line orientation 22, illustrated with reference again to FIG. 1, or in the wall mounting orientation 26, as illustrated with reference again to FIG. 9. As illustrated with reference again to FIGS. 5 and 7, by way of example, the top body portion 14, in one preferred embodiment, includes a triangular cross-section. With such, the top surface 18 falls within a plane passing thorough a rear surface 40 of the bottom body portion 16, not necessary, but convenient for mounting along a vertical wall. Alternate cross-sections and housing surface and wall dimensions will come to the mind of one skilled in the art of packaging without deviating from the scope of the present invention.

Figure 10:
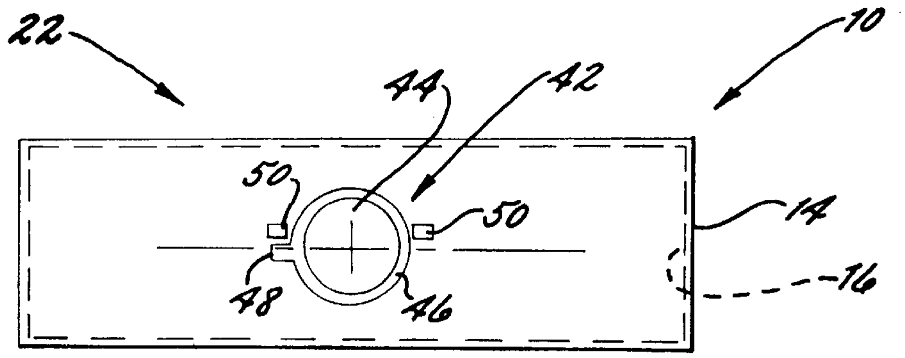
FIGS. 10, 11, and 12 are plan views of first and second body portion surfaces rotatably operable from the in-line orientation, through an intermediate orientation, and to the wall mounting orientation, respectively.
Figure 11:
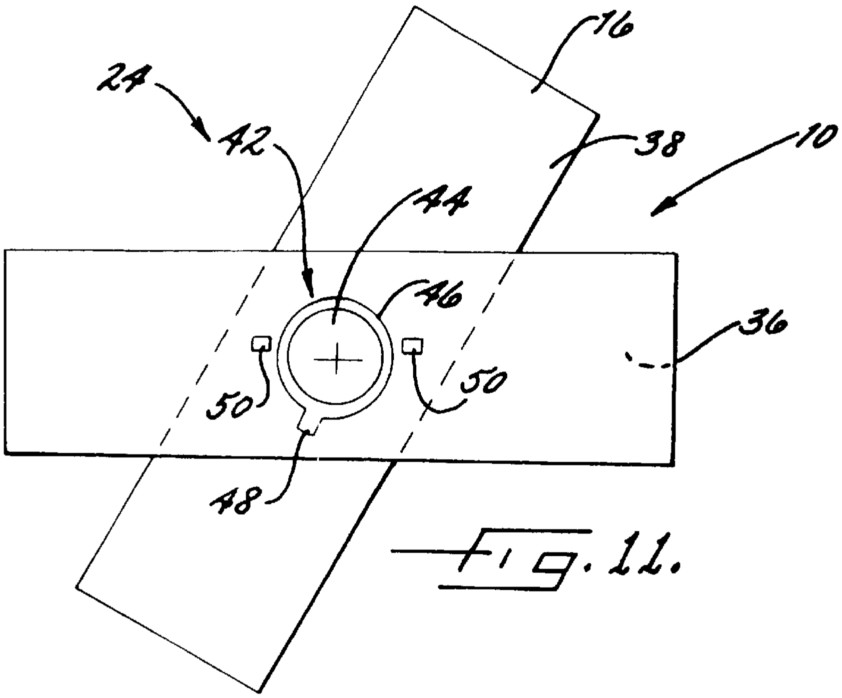
Figure 12:
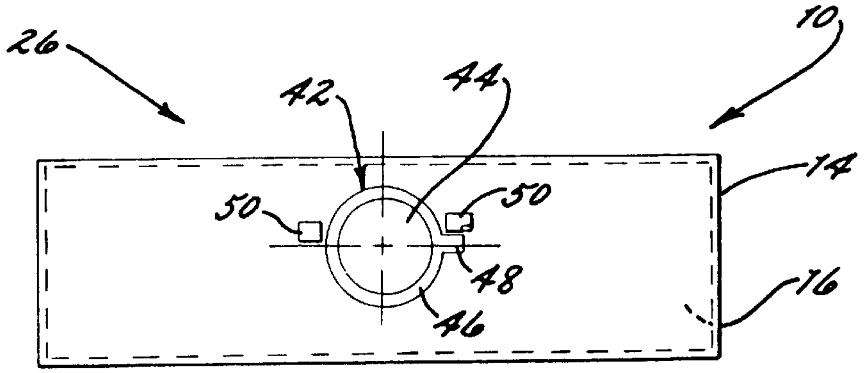

As illustrated with reference to FIGS. 10, 11, and 12, the module 10 further includes rotation limiting means 42 for limiting rotation of the top body portion 14 with the bottom body portion 16. The angled surfaces 36, 38 of the top and bottom body portions 14, 16, earlier described, slidably rotate on each other. In one embodiment of the rotation limiting means 42 of the present invention, the housing sides having the angled surfaces 36, 36 include concentric apertures 44 which provide for wire transfer between the top and bottom body portions 14, 16. Although top and bottom are interchangeable, the bottom body portion 16 for discussions herein includes a snap ring 46 which extends from a perimeter of its aperture 44 and slidably engages the perimeter of the aperture 44 of the top body portion 14. The snap ring 46 includes a projection 48 which operates between a pair of stops 50 carried by the top body portion 14 on an inside surface opposing the angled surface 36. Thus, rotation between the in-line and wall mounting orientations 22, 26 is limited for avoiding an undesirable twisting in one continuous direction of any wire that may pass between the top and bottom body portions 14, 16.

To further aid the user in moving the module 10 between orientations 22, 26, rotation indication means 52 is carried by the top and bottom body portions 14, 16 for indicating a direction of a rotation. In a preferred embodiment of the invention, and as illustrated by way of example with reference again to FIGS. 6, 8, and 9, a clockwise rotation arrow 54 appears on the rear surface 40 of the housing 12, as illustrated with reference again to FIG. 6, when the module 10 is in the in-line orientation 22. The clockwise rotation arrow 54 includes an arrow head portion **54*a* carried on the top body portion 14, and a tail portion 54*b* carried on the bottom body portion 16. A spaced apart trailing end 54*c*, 54*d* of the arrow is also carried on the rear surface 40. Rotation of the body portions 14, 16 to the wall mounting orientation 26 results in a counter clockwise arrow 56, with an arrow head portion 56*a* carried on the top surface 18 which is positioned for aligning with the trailing end 54*c* carried on the bottom body portion 16, as illustrated with reference again to FIG. 9. A spaced apart trailing end 56*b* is positioned to align with the tail portion 54*b* of the clockwise arrow 54. Thus rotation between the in-line and wall mounting orientations 22, 26 will alternately be achieved with clockwise and counter clockwise moves to avoid a continuous twisting in one direction of wire 58, illustrated by way of example with reference to FIG. 13, which wire 58 is carried through the apertures 44 between the top and bottom body portions 14, 16**.

Figure 13:
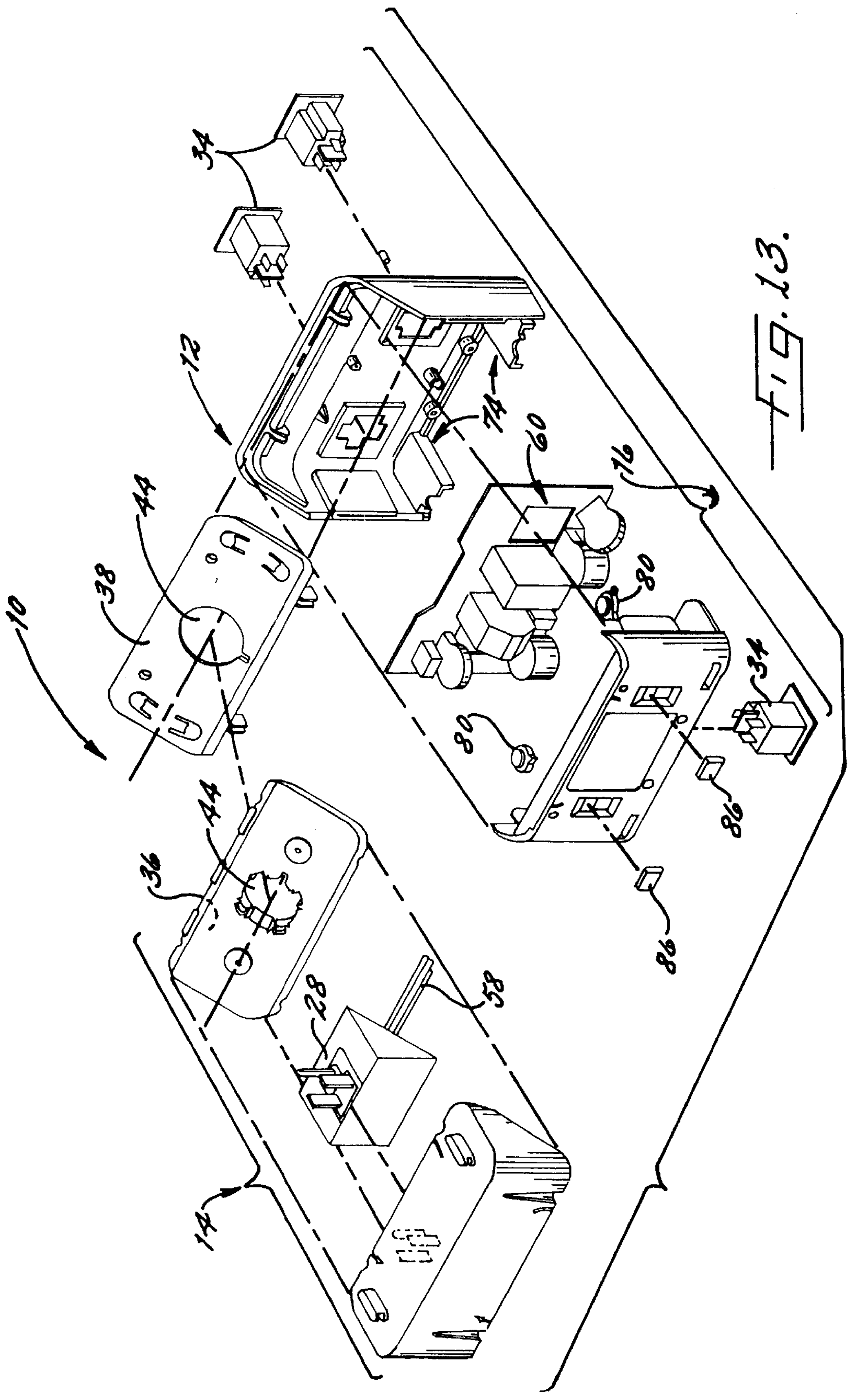
FIG. 13 is an exploded perspective view of the module embodiment of FIG. 1.

Further, with reference to FIG. 13, a surge suppression and filtering circuit 60 is carried by the housing 12, within the bottom body portion 16 for one embodiment herein illustrated by way of example, which circuit is operable with the male and female plugs 28, 34 for protection of electronic equipment (not shown) operable with the surge suppression module 10. By way of example only in describing the present invention, female NEMA power plugs 34, 62 have been illustrated in the power receptacle module 10 of FIGS. 1–13. As will be described later, alternate module embodiments provide protection through low voltage connectors is also included within the scope of the present invention.

Figure 14:
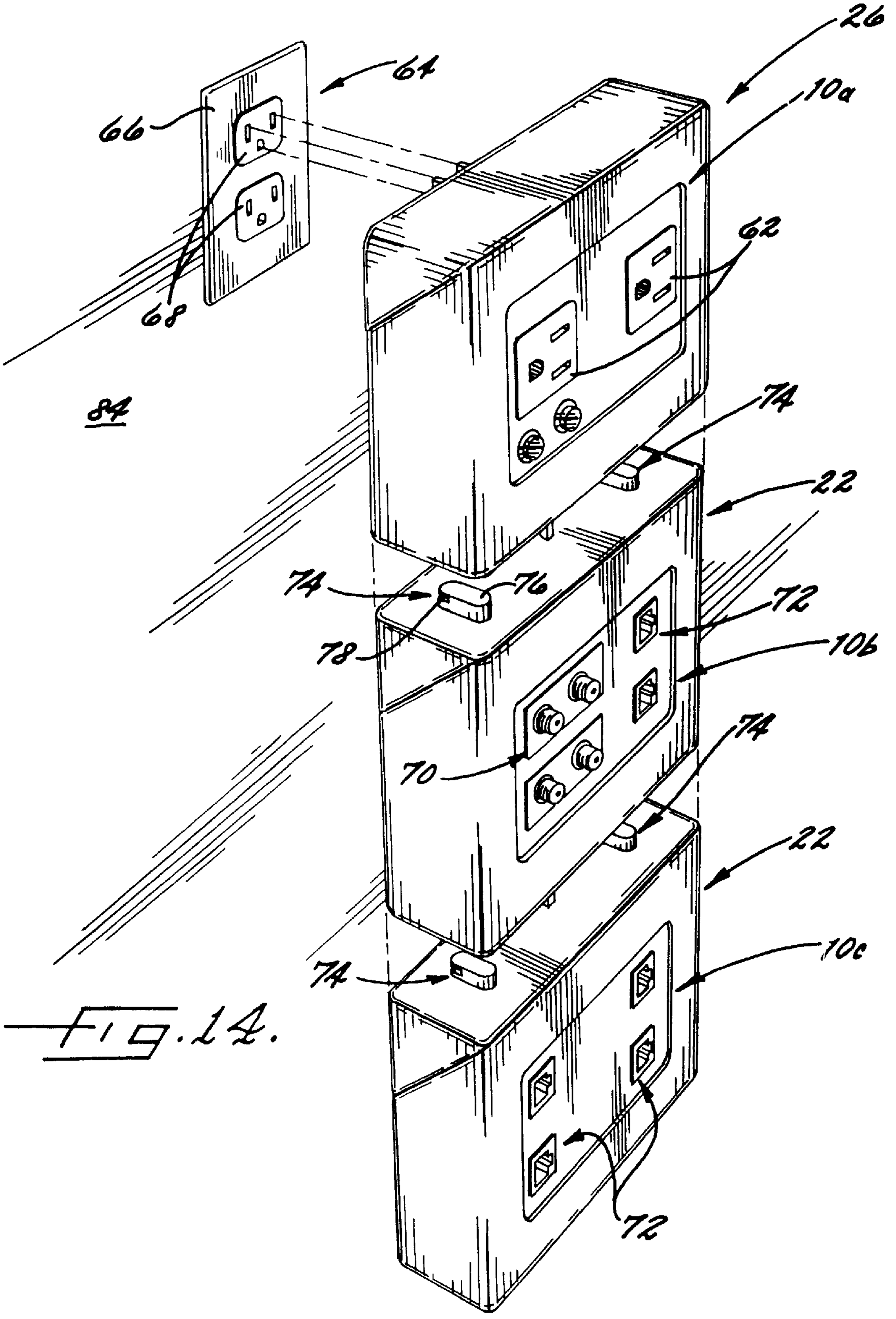
FIG. 14 is an exploded perspective view of a plurality of connected surge suppression modules.
Figures 15, 18:
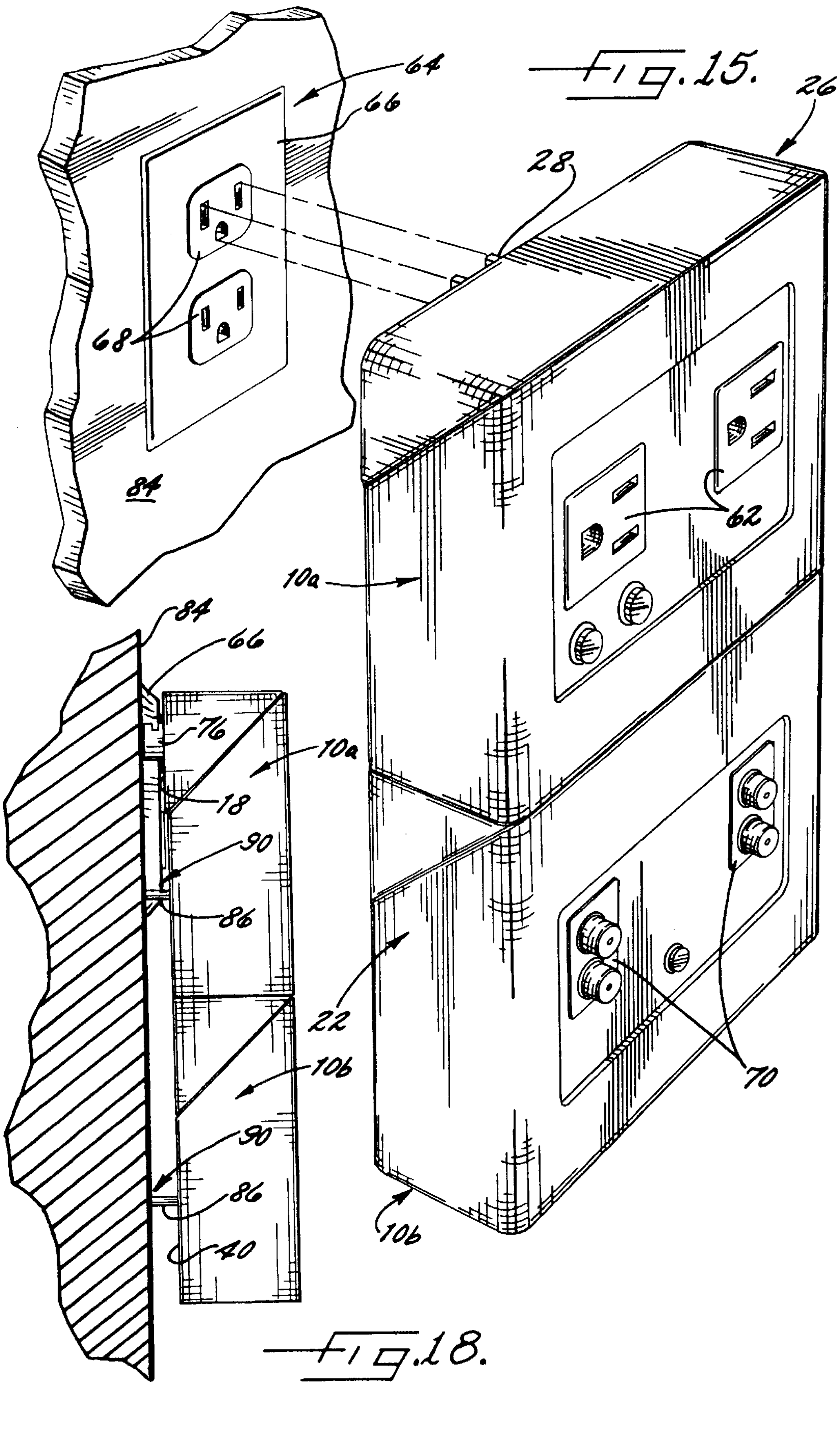
FIG. 15 is a perspective view of a cable connector module in an in-line orientation connected to a power module in a wall mounting orientation for engaging an electrical wall receptacle.
FIG. 18 is a side elevation view of the modules of FIG. 13 positioned against a wall surface.

As illustrated with reference to FIGS. 14 and 15, a plurality of modules 10 are connected with a first power module **10*a* in the wall mounting orientation 26 for plugging into a wall receptacle 64 having a typical wall plate 66 surrounding female wall plugs 68 for receiving the male plug 28 carried in the top body portion 14. As further illustrated, additional audio/video and telecommunications low voltage modules 10*b*, 10*c*, arranged in the in-line orientation 22 are connected in an in-line fashion to each other. The alternate embodiments of the module 10*b*, 10*c*, include low voltage connectors including audio/video connectors 70 and telecommunications connectors 72, by way of example. There is no particular order for interconnection of the modules 10*a*, 10*b*, and 10*c***.

Generally, the frictional connection between the male plug 28 and female plug 34 of the module 10 is sufficient to hold adjoining modules **10*a*, 10*b*, and 10*c***together.

Figure 16:
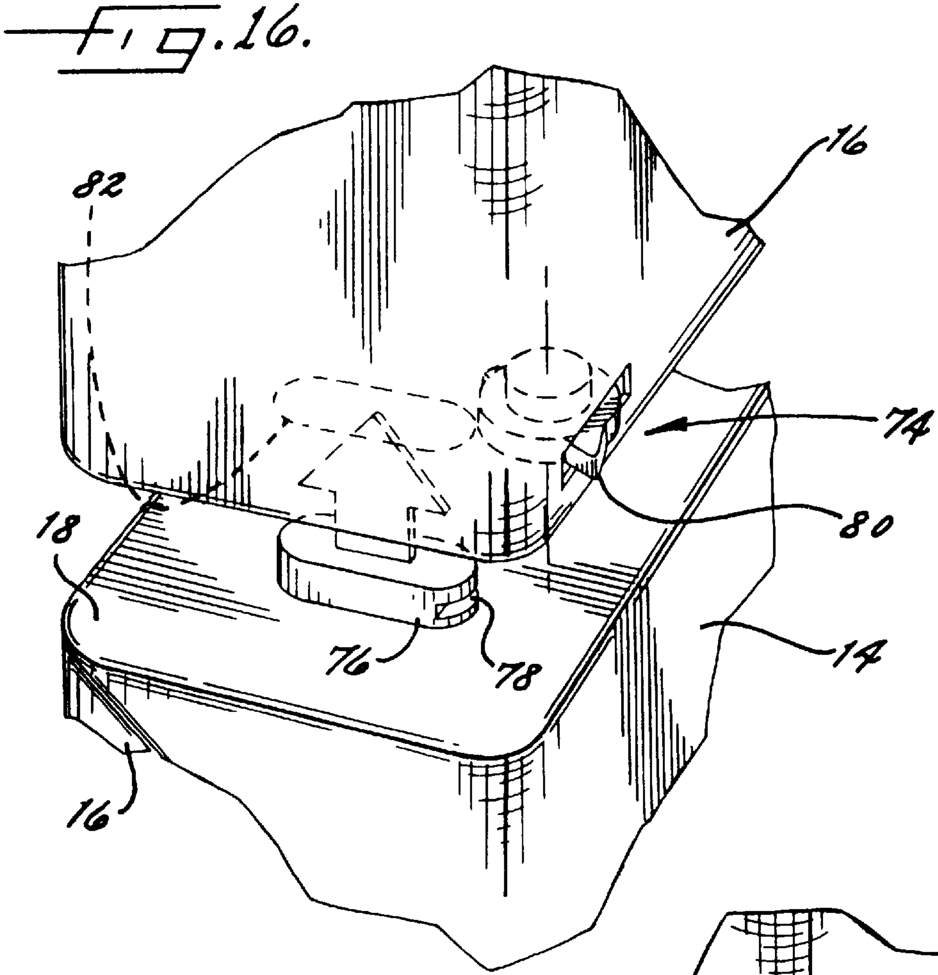
FIG. 16 is a partial exploded view of module interlocking means having a notched tab and cam in an unlocked position.
Figure 17:
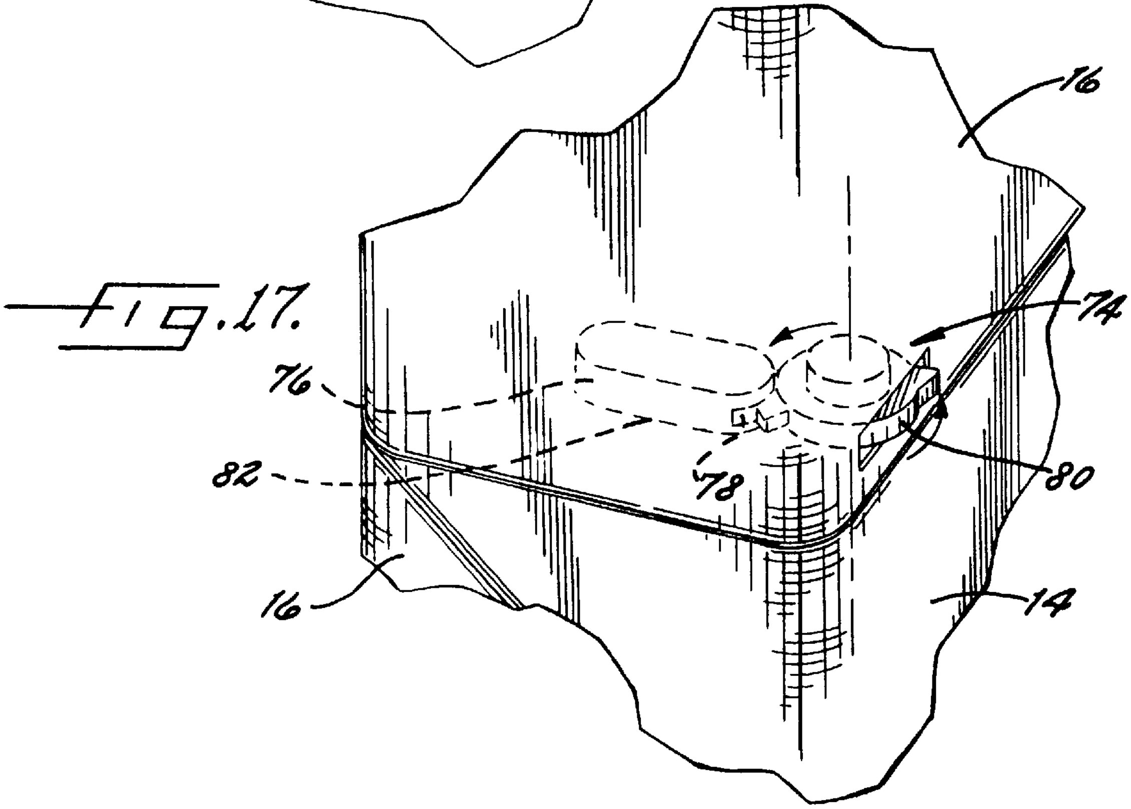
FIG. 17 is a partial exploded view of the interlocking means of FIG. 11 in a locked position.

However, to accommodate the use of multiple connections from electronic equipment and a multiple series connection of modules 10, interlocking means 74 for interlocking the top surface 18 of one module 10*b*, by way of example, to the bottom surface 20 of an adjoining module 10*a* are provided as illustrated with reference again to FIGS. 1–9, 14 and 15. In one preferred embodiment of the present invention, the module 10 includes the interlocking means 74 having a tab 76 extending from the top surface 18 of the top body portion 14. The tab 76 has a notch 78 therein, as illustrated with reference again to FIGS. 5–7, and to FIGS. 16 and 17. A cam 80 is rotatably carried within the bottom body portion 16 for engaging the notch 78 in the tab 76. In a preferred embodiment, the bottom surface 20 includes an opening 82 therein for receiving the tab 76 therethrough and engaging the cam 80 within the notch 78 for locking the top surface 18 of one module to the bottom surface 20 of the adjoining module. In a preferred embodiment of the module 10, a pair of tabs 76 is arranged on the top surface 18 and spaced apart for receiving the wall plate 66 therebetween. Further, and as illustrated with reference again to FIG. 18, the tabs 76 extend outward from the surface 18 of the housing 12 to a distance sufficient for contacting the wall surface 84 and providing stability to the module 10 without relying on contact with the wall plate 66. However, it is to be understood that the tab 76 and cam 80 may be located elsewhere within the housing 12 and remain within the scope of the present invention.

In the preferred embodiment, herein described by way of example, the module 10 further comprises a foot 86 rotatably carried by the housing 12 within the bottom body portion 16, as illustrated with reference again to FIGS. 6 and 9. A pair of feet includes each foot 86 rotatable from a stored position 88 within the housing 12 to an extended position 90 extending outward from the rear surface 40 for contacting the wall surface 84 positioned proximate the module 10, as illustrated with reference to FIG. 18. Each foot 86 is dimensioned to extend from the rear surface 40 of the housing 12 for holding the module 10 and the rear surface 40 generally parallel to the wall surface 84. Further, the foot 86 cooperates with the tab 76 for providing a stable arrangement of connected modules 10 which are biased against the wall surface 84 under a leveraged gravitational force while connected to the female wall plug 68.

It is to be understood that even though numerous characteristics and advantages of the present invention have been set forth in the foregoing description, together with details of the structure and function of the invention, the disclosure is illustrative only, and changes may be made in detail, especially in matters of shape, size and arrangement of parts within the principles of the invention to the full extent indicated by the broad general meaning of the terms in which the appended claims are expressed.

That which is claimed is:

1. A surge suppression modular system comprising:

a support surface having an electrical receptacle for receiving an electrical plug therein;

first and second modules, each having a housing with a first body portion rotatably connected to a second body portion, the first body portion having a first surface of the housing parallel to a second surface of the housing carried by the second body portion, the first and second surfaces forming opposing side surfaces of the housing when the first and second body portion are in an in-line orientation, the first and second body portions rotatable from the in-line orientation to a wall mounting orientation, wherein the first surface on the first body portion is perpendicular to the second surface on the second body portion;

a male plug and a female plug carried by the housing of each of the first and second modules, the male plug carried by one of the first and second surfaces and the female plug carried by the other of the first and second surfaces; and a surge suppression and filtering circuit carried by the housing of each of the first and second modules and each operable with the male and female plugs for protection of electronic equipment operable with the surge suppression module, wherein the first module having its housing in the wall mounting orientation with its male plug connected to the receptacle of the electrical outlet, and the second module having its housing in the in-line orientation and electrically connected to the first housing with the male plug of the second housing connected to the female plug of the first housing.

2. The modular system as recited in claim 1, further comprising interlocking means for each of the first and second modules, the interlocking means interlocking the first surface of the second module to the second surface of the first module.

3. The modular system as recited in claim 2, wherein the interlocking means comprise:

a tab extending from the first surface of the first body portion, the tab having a notch therein; and a cam carried by the second body portion for engaging the notch of the tab, wherein the second surface includes an opening therein for receiving the tab therethrough and engaging the cam within the notch for interlocking the first surface of one of the first and second modules to the second surface of an adjoining one of the first and second modules.

4. The modular system as recited in claim 3, wherein the electrical receptacle comprises a surface plate covering a portion of the receptacle, and wherein the interlocking means comprises first and second tabs positioned in spaced relation for placing the surface plate therebetween.

5. The modular system as recited in claim 3, further comprising a foot rotatably carried by the housings of the first and second modules, the foot rotatable from a stored position within the housing to an extended position extending a outward from a housing surface to a distance to which the tab extend from the first surface for each contacting the support surface positioned proximate the modules and positioning the modules generally parallel to the support surface.

6. The modular system as recited in claim 1, further comprising a foot rotatably carried by the housings of the first and second modules, the foot rotatable from a stored position within the housing to an extended position extending outward from a housing surface for contacting the support surface positioned proximate the module and supporting the modules in a spaced relation therefrom.

7. The modular system as recited in claim 1, wherein each of the housings for the first and second modules further comprise;

a third surface on the first body portion, the third surface opposing and angled at 45° to the first surface on the first body portion;

a fourth surface on the second body portion, the fourth surface opposing and angled at 45° to the second surface on the second body portion; and wherein the third and fourth surfaces are rotatably connected for rotation from the in-line orientation to the wall mount orientation of the first and second body portions.

8. The modular system as recited in claim 1, wherein the male and female plugs comprises male and female AC power plugs.

9. The modular system as recited in claim 1, further comprising a plurality of connectors carried by the housings of each of the first and second modules and operable with the surge suppression and filtering circuit for connection to electronic equipment selected from the group consisting of power, telecommunications, computer, audio and video.

10. The modular system as recited in claim 1, further comprising rotation limiting means for limiting rotation of the first body portion with the second body portion for each of the housings of the first and second modules.

11. The modular system as recited in claim 1, further comprising rotation indication means carried by the first and second body portions for each of the housings for the first and second modules for indicating a direction of rotation for the first body portion about the second body portion.

12. A surge suppression module comprising:

a housing having a first body portion rotatably connected to a second body portion, the first body portion having a first surface of the housing parallel to a second surface of the housing carried by the second body portion, the first and second surfaces forming opposing side surfaces of the housing when the first and second body portion are in an in-line orientation, the first and second body portions rotatable from the in-line orientation to a wall mounting orientation, wherein the first surface on the first body portion is perpendicular to the second surface on the second body portion;

a male plug carried by one of the first and second surfaces and a female plug carried by the other of the first and second surfaces; and a surge suppression and filtering circuit carried by the housing and operable with the male and female plugs for protection of electronic equipment operable with the surge suppression module.

13. The module as recited in claim 12, further comprising interlocking means for interlocking the first surface of the module to the second surface of an adjoining module removably attached to each other with the male plug of one module connected to the female plug of the adjoining module.

14. The module as recited in claim 13, wherein the interlocking means comprise:

a tab extending from the first surface of the first body portion, the tab having a notch therein; and a cam carried by the second body portion for engaging the notch of the tab, wherein the second surface includes an opening therein for receiving the tab therethrough and engaging the cam within the notch for interlocking the first surface of one module to the second surface of the adjoining module.

15. The module as recited in claim 12, further comprising a foot rotatably carried by the housing, the foot rotatable from a stored position within the housing to an extended position extending outward from a housing surface for contacting a support surface positioned proximate the module.

16. The module as recited in claim 12, further comprising;

a third surface on the first body portion, the third surface opposing and angled at 45° to the first surface on the first body portion;

a fourth surface on the second body portion, the fourth surface opposing and angled at 45° to the second surface on the second body portion; and wherein the third and fourth surfaces are rotatably connected for rotation from the in-line orientation to the wall mount orientation of the first and second body portions.

17. The module as recited in claim 12, wherein the male and female plugs comprises male and female AC power plugs.

18. The module as recited in claim 12, further comprising a plurality of connectors carried by the housing and operable with the surge suppression and filtering circuit for connection to electronic equipment selected from the group consisting of power, telecommunications, computer, audio and video.

19. The module as recited in claim 12, further comprising rotation limiting means for limiting rotation of the first body portion with the second body portion.

20. The module as recited in claim 12, further comprising rotation indication means carried by the first and second body portions for indicating a direction of rotation for the first body portion about the second body portion.

21. An electrical circuit module comprising:

a first body portion having a male plug;

a second body portion having a female plug operable with the male plug, the first and second body portions rotatably connected for rotation from an in-line orientation wherein the male and female plugs are aligned within an axis through the first and second body portions, to a wall mounting orientation wherein the male and female plugs are orientated perpendicular to each other; and an electrical circuit carried within at least one of the first and second body portions and operable with the male and female plugs.

22. The module as recited in claim 21, further comprising interlocking means for interlocking one module to an adjoining module.

23. The module as recited in claim 22, wherein the interlocking means comprise:

a tab extending from first body portion, the tab having a notch therein; and a cam carried by the second body portion for engaging the notch of the tab.

24. The module as recited in claim 21, further comprising a foot rotatably carried by at least one of the first and second body portions, the foot rotatable from a stored position within the body portion to an extended position extending outward from the body portion for contacting a support surface positioned proximate the module.

25. The module as recited in claim 21, further comprising;

an axis of rotation for the first and second body portion angled at 45° to the axis through the first and second body portions.

26. The module as recited in claim 21, wherein the male and female plugs comprises male and female AC power plugs.

27. The module as recited in claim 21, further comprising a plurality of connectors carried by at least one of the first and second body portions and operable with the electrical circuit for connection to electronic equipment selected from the group consisting of power, telecommunications, computer, audio and video.

28. The module as recited in claim 21, further comprising rotation limiting means for limiting rotation of the first body portion with the second body portion.

29. The module as recited in claim 21, further comprising rotation indication means carried by the first and second body portions for indicating a direction of rotation for the first body portion about the second body portion.

30. A method for providing surge suppression to electronic equipment, the method comprising the steps of:

providing first and second modules, each having a housing with a first body portion rotatably connected to a second body portion, the first body portion having a first surface of the housing parallel to a second surface of the housing carried by the second body portion, the first and second surfaces forming opposing side surfaces of the housing when the first and second body portion are in an in-line orientation, the first and second body portions rotatable from the in-line orientation to a wall mounting orientation, wherein the first surface on the first body portion is perpendicular to the second surface on the second body portion, a male plug and a female plug carried by the housing of each of the first and second modules, the male plug carried by one of the first and second surfaces and the female plug carried by the other of the first and second surfaces, and a surge suppression and filtering circuit carried by the housing of each of the first and second modules and each operable with the male and female plugs for protection of electronic equipment operable with the surge suppression module;

placing the housing of the first module in the wall mounting orientation;

plugging the male plug into a wall receptacle;

placing the housing of the second module in the in-line orientation;

plugging the male plug of the second module into the female plug of the first module; and connecting electronic equipment selected from the group consisting of power, telecommunications, computer, audio and video to the surge suppression and filtering circuits carried by the first and second modules.

31. The method as recited in claim 30, further comprising the step of interlocking each of the first and second modules.

32. The method as recited in claim 31, wherein the interlocking step comprises the step of:

extending a tab from the first surface of the first body portion, the tab having a notch therein; and engaging a cam carried by the second body portion.

33. The method as recited in claim 32, further comprising the step of extending a foot rotatably carried by the housings of the first and second modules, the foot rotatable from a stored position within the housing to an extended position extending outward from a housing surface for positioning the modules generally parallel to the support surface.

34. The method as recited in claim 30, wherein each of the housings for the first and second modules further comprise a third surface on the first body portion, the third surface opposing and angled at 45° to the first surface on the first body portion, and a fourth surface on the second body portion, the fourth surface opposing and angled at 45° to the second surface on the second body portion.

35. The method as recited in claim 30, further comprising the step of limiting the rotation of the first body portion with the second body portion for each of the first and second modules.

36. The method as recited in claim 30, further comprising the step of indicating a direction of rotation for the first body portion about the second body portion for each of the housings of the first and second modules.

37. A method for providing protection to electronic equipment, the method comprising the steps of:

providing a module including a first body portion having a male plug, a second body portion having a female plug operable with the male plug, the first and second body portions rotatably connected for rotation from an in-line orientation wherein the male and female plugs are aligned within an axis through the first and second body portions, to a wall mounting orientation wherein the male and female plugs are orientated perpendicular to each other, and an electrical circuit carried within at least one of the first and second body portions and operable with the male and female plugs;

placing the module in the wall mounting orientation;

plugging the male plug into a wall receptacle; and connecting electronic equipment to the electrical circuit.

38. The method as recited in claim 37, further comprising the steps of:

placing a second module in the in-line orientation;

plugging the male plug of the second module into the female plug of the first module.

39. The method as recited in claim 38, further comprising the step of interlocking each of the first and second modules.

40. The method as recited in claim 39, wherein the interlocking step comprises the step of:

extending a tab from the first body portion, the tab having a notch therein; and engaging a cam carried by the second body portion.

41. The method as recited in claim 37, further comprising the step of extending a foot rotatably carried by the housings of the first and second modules, the foot rotatable from a stored position within the modules to an extended position extending outward therefrom for positioning the modules generally parallel to a support surface.

42. The method as recited in claim 37, further comprising the step of limiting the rotation of the first body portion with the second body portion.

43. The method as recited in claim 37, further comprising the step of indicating a direction of rotation for the first body portion about the second body portion for each of the housings of the first and second modules.

* * * * *